United States Patent [19]

Gupta

[11] Patent Number: 5,502,178

[45] Date of Patent: Mar. 26, 1996

[54] METHODS FOR PRODUCING AMIDATED OR AMINATED WATER SOLUBLE CELLULOSE ACETATES

[75] Inventor: Balarum Gupta, North Plainfield, N.J.

[73] Assignee: Hoechst Celanese Corp., Somerville, N.J.

[21] Appl. No.: 110,072

[22] Filed: Aug. 20, 1993

Related U.S. Application Data

[62] Division of Ser. No. 742,983, Aug. 9, 1991, abandoned.

[51] Int. Cl.$^6$ .................................................. C08B 15/00
[52] U.S. Cl. ............................... 536/32; 536/20; 536/124
[58] Field of Search ................................ 536/20, 32, 124

[56] References Cited

U.S. PATENT DOCUMENTS 3,635,818  1/1972  Muzzarelli ........................... 210/31 C

OTHER PUBLICATIONS

A. Streitwieser and C. H. Heathcock "Introduction to Organic Chemistry" MacMillan Publishing Co., Inc.; New York 1976, p. 765.
Ritter and Kalish, *J. Am. Chem. Soc.* 1948, 70, 4048–50.
Botta et al. *Synthesis* 1977, 722–723.
Muzzarelli et al. *J. Membrane Sci.* 1983, 16, 295–308.

*Primary Examiner*—Douglas W. Robinson
*Assistant Examiner*—Kathleen Kahler Fonda
*Attorney, Agent, or Firm*—Hans-Peter Hoffmann; Michael W. Ferrell

[57] ABSTRACT

A method is disclosed of preparing amidated water soluble cellulose acetates by amidating water soluble cellulose acetate. Methods are also provided for preparing aminated water soluble cellulose acetates of varying plasticities, film- and fiber-forming characteristics, and other properties by methanolysis of naturally-occurring chitin or by amination of water soluble cellulose acetate.

11 Claims, No Drawings

METHODS FOR PRODUCING AMIDATED OR AMINATED WATER SOLUBLE CELLULOSE ACETATES

This application is a divisional of application Ser. No. 07/742,983, filed on Aug. 9, 1991, now abandoned.

BACKGROUND OF THE INVENTION

Chitin, poly-β-(1→4)-N-acetyl-D-glucosamine, is a cellulose-like biopolymer which is the primary constituent of the cell wall in most fungi, molds, and yeasts and the exoskeleton of crustaceans and insects. The amount of chitin relative to total dry weight of these organisms is highest in crustaceans, where it is commonly found as the tough polymer matrix of crab and shrimp shells. Crustacean shells are currently the primary source of commercial chitin.

Chitosan, poly-β-(1→4)-2-deoxy-D-glucosamine, the deacetylated derivative of chitin, has great potential value because of its free amines, for new chemical and medical applications. Chemically, chitosan's free amines possess the ability to chelate with many metals (see Muzzarelli et al., *Journal of Membrane Science* 16: 295–308 (1983)) and other ions. It thus has the potential for use in a wide variety of applications such as metal recovery from industrial wastes and fibers with improved dyeability, among others.

Biologically, chitin and chitosan provide sources of glucosamine, a potentiator for antibiotics (see Austin et al., *Science* 212: 749–753 (1981)) and consequently a substance with wound-healing properties. Chitosan is a hemostatic, and it also promotes collagen formation, thus preventing scar formation. The chemistry of chitosan also confers upon it excellent film forming properties (see Muzzarelli et al.), and it would be expected to have great utility in the formation of membranes. Its toughness can be utilized in producing high strength fibers and bioseparation films and it therefore may have other medical applications such as sutures.

Chitosan can itself be chemically modified to provide materials with other additional useful properties. Muzzarelli et al. discloses N-alkylation of chitosan as a method of varying the plasticity and other properties of membranes, fibers and other chitosan-derived materials. This method for production of various N-alkyl chitosans, however, requires the expensive chitosan as the starting material.

Chitin's ready availability and abundance, as waste material from canning food industries, allow broad research on its capabilities and make it very attractive as starting material for the synthesis of chitosan. One drawback of the natural starting product, however, is that its properties can vary considerably depending on the source and method of preparation (see Austin et al.); this could pose great difficulty in controlling and attributing the properties of the end product.

Problems have also been encountered during the production of chitosan from chitin, normally attempted by alkaline hydrolysis of the chitin. Reports have contended that solvents doped with chlorides such as LiCl are useful in adjusting the solubility of chitin during alkaline hydrolysis. Chitin, however, lacks a good direct solvent; in fact, chitin is insoluble in conventional solvent systems. Chitin is also easily degraded in the presence of acid. Therefore acid catalyzed hydrolysis is very difficult and one has to balance the rate of hydrolysis with the rate of degradation. One alternative, then, for the production of chitosan from naturally-occurring chitin would be a process involving less harsh conditions and one affording greater solubility of the starting material.

Due to the variability of chitin sources and the difficulty of working with chitin it may be advantageous to develop synthetic molecules similar to chitin and chitosan by aminating or amidating cellulosic materials. Haskins, U.S. Pat. No. 2,136,299 and Meigs, U.S. Pat. No. 1,801,053 disclose processes for the amination of carbohydrate and cellulosic materials. However these do not involve direct amination; rather they rely upon an initial step of harsh and degradative acid treatment. Dreyfus, U.S. Pat. Nos. 2,007,950; 2,186,101; and 2,233,475 disclose processes for the production of cellulosic materials containing nonacidic nitrogen, including amino groups, but the processes are not directed to any specific derivatizations or sites of derivatization. Furthermore, the amination processes do not afford direct (i.e., one-step) amination of the cellulosic materials.

Accordingly, new methods have been sought for the synthesis of chitin and chitosan under milder reaction conditions and for synthesis from more economical, tractable and homogeneous starting materials. Additionally, methods have been sought which have the regioselectivity to ensure that the important functional groups are placed as in the naturally occurring counterparts. Finally, new methods have been sought for the synthesis of N-alkylated chitosans from starting materials considerably cheaper than the parent chitosan itself.

SUMMARY OF THE INVENTION

The invention provides more efficient, and economical methods for the production of chitosan polymers. One embodiment of the invention provides a process for the methanolysis of plentiful, naturally occurring chitin to form chitosan. This process allows for economy and for easier handling of the starting material as well as increased maintenance of the integrity thereof.

The invention further provides a process for the amidation of water soluble cellulose acetate to produce chitosan. This process allows for the production of the expensive chitosan from an inexpensive, tractable and relatively homogeneous starting material.

The invention also provides a process for the amination of water soluble cellulose acetate to produce a variety of N-alkyl chitosans. This process affords the direct amination of cellulosic materials. Furthermore, it does not require the expensive chitosan as a starting material.

DETAILED DESCRIPTION OF THE INVENTION

Methanolysis of Chitin

The current process for alkaline hydrolysis of chitin, using NaOH as a solvent, is particularly uneconomical and generates large amounts of waste. The process requires stoichiometric amounts of alkali and demands harsh reaction conditions. Acid catalyzed methanolysis of chitin is a more economical and safer procedure. Methanolysis of chitin in NMP (1-methyl-2-pyrrolidinone) and 5% LiCl as solvent system proceeds as follows:

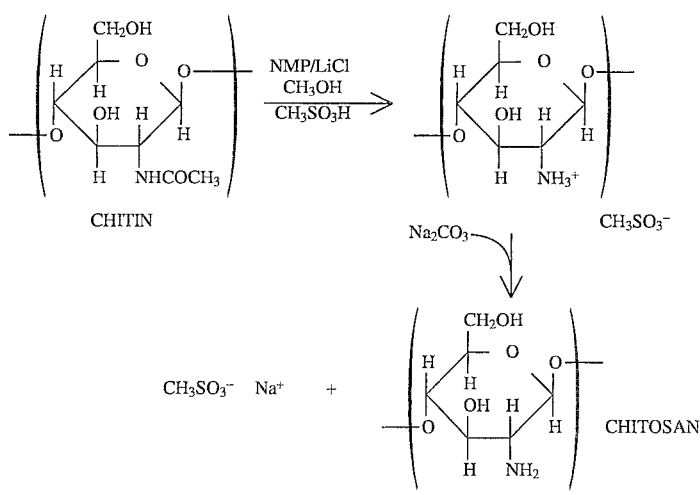

Hydrolysis of chitin was attempted in various solvents and with different acids. The preferred system shown above with methanol as the solvent and methanesulfonic acid as the catalyst as described in Example 1 was found to be the best medium to carry out this reaction. The resulting product from this reaction displayed an identical infrared spectrum to that of pure chitosan. Various other-attempted reactions with many different acids such as concentrated sulfuric acid, hydrochloric acid and a range of solvents such as water, methanol, and ethanol were unsuccessful and did not result in any appreciable amounts of hydrolyis.

As illustrated in Example 1, in a preferred embodiment of the invention, hydrolysis of the acetyl group is achieved by using methanol as the solvent, methanesulfonic acid as the catalyst, and NMP with 5% LiCl to dissolve the chitin.

EXAMPLE 1

5.0 g LiCl was dissolved in 100 ml NMP, with gentle stirring, in a 250 ml round-bottom flask. 1.0 g chitin was added and dissolved by reflux in the solvent system for 6 hours. 5 ml $CH_3SO_3H$ and 12 ml $CH_3OH$ were then added to the flask of viscous dark liquid, followed by refluxing for about 8 hours. At the end of this time, the product was precipitated out by slowly dropping the reaction mixture into 500 ml acetone by way of a separatory funnel. After all of the reaction mixture was dropped into acetone, the pH was raised to 8.5–9.0 with 25% by weight $Na_2CO_3/H_2O$ solution. 300 ml water were added to the stirring solution to remove any salt formed. The product was then vacuum filtered and oven dried at 100° C. until a constant weight was obtained.

Infrared spectroscopy was performed on the product after drying and it was determined that hydrolysis did indeed occur. The product was further purified as follows: 25 ml concentrated HCl was added to 100 ml water in a 150 ml Erlenmeyer flask. The product was added and heated to boiling for no more than 5 minutes. It was then filtered hot and the filtrate was allowed to cool. The filtrate was neutralized with 20% by weight $Na_2CO_3/H_2O$ to a pH of about 9.0–10.0. A greenish brown precipitate was formed. The resulting hydrolyzed chitin—chitosan—was filtered and oven dried at 100° C. until a constant weight was obtained as before.

Amidation of Water Soluble Cellulose Acetate

The direct amidation of alcohols by nitrilic solvents in the presence of strong acids is known as the Ritter reaction (Ritter and Minieri, *Journal of the American Chemical Society* 70: 4045–4048 (1948)). The reaction proceeds as follows:

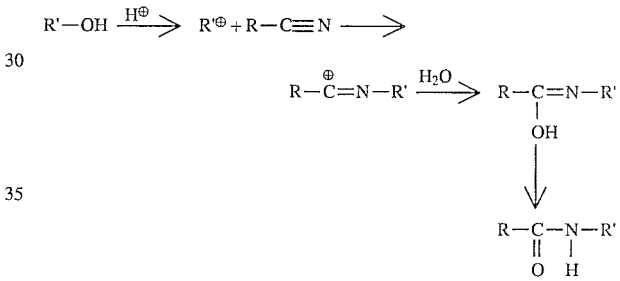

The reaction is more facile with alcohols which result in stable carbocations; tertiary or benzylic alcohols react more readily than secondary alcohols, and primary alcohols do not give the reaction. The present invention uses a Ritter type reaction to amidate water soluble cellulose acetate (WSCA), preferably at the secondary position. However, the reaction conditions must be selected to promote regioselectivity, that is to amidate preferentially at the second position of the glucose ring in the cellulose as follows:

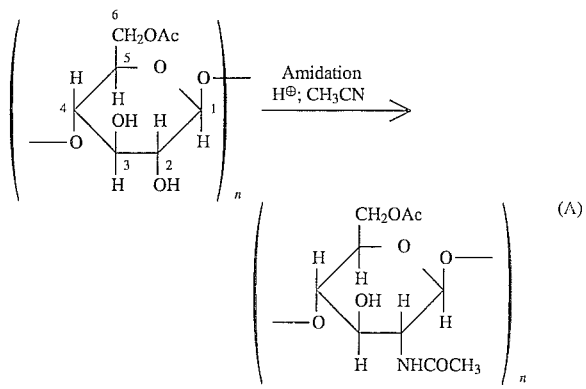

-continued

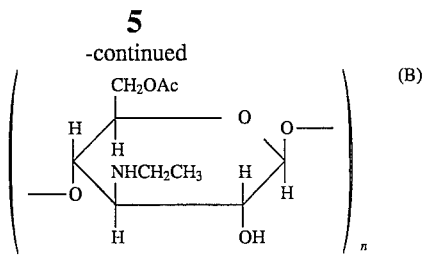

Although the site of amidation of WSCA is shown at the preferred position 2, equal probability of amidation at position 3 of the glucose ring cannot be ruled out. The resulting product with amidation primarily at position 2 should be structurally identical to naturally occurring chitin with an acetyl group esterified at position 6. Hydrolysis of this product should produce chitosan.

The amidation of WSCA was carried out in various solvents, in different acids and under different temperatures to determine the best reaction conditions for amidation of WSCA. Two different grades, low and medium viscosity, of WSCA were used. The conditions giving the highest degree of substitution, as determined by the percent nitrogen in the product by elemental analyses, were found to be when low viscosity grade WSCA dissolved in DMSO, and concentrated sulfuric acid in acetonitrile were heated at 75° C. as in Example 2. The results are summarized in Table 1. Other solvents such as NMP and other protonating agents such as methanesulfonic acid may also be used.

There was no appreciable reaction at room temperature either using methanesulfonic acid (MSA) or sulfuric acid as the acid and using NMP or dimethyl sulfoxide (DMSO) as solvent. The WSCA used in these runs was completely recovered by precipitating the product in acetone. There was no degradation of WSCA under these conditions. When the reaction mixtures were heated to higher temperatures, the product isolation was more difficult, and probably some degradation of WSCA may have occurred between 50° and 75° C. Significant degradation of WSCA took place at 100° C.

tion was then slowly added to the sulfuric acid solution, which was still in the ice bath. After most of the materials were dissolved, the reaction solution was placed and stirred in an oil bath which was heated to 75° C. under argon atmosphere. After two hours, the reaction solution was taken out of the oil bath and was hydrolyzed by the addition of 50 ml of distilled water. The resulting solution was then dropped into 750 ml of acetone to precipitate the product. The product was then filtered, dried in a vacuum oven at 50° C. until constant weight was obtained.

Amination of Water Soluble Cellulose Acetate

The amination of alcohols in the presence of nickel is a well known process. Primary and secondary alcohols have been aminated with secondary amines using aluminum t-butoxide and Raney nickel (see Botta et al., *Synthesis*, 722–723 (1977)) as depicted in the following equation:

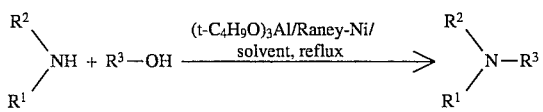

Amination of water-soluble cellulose acetate proceeds as follows:

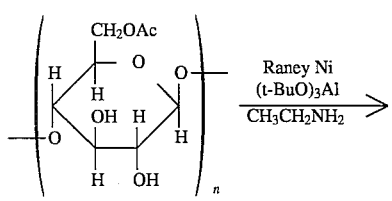

TABLE 1

Summary of Results of Amidation of Water Soluble Cellulose Acetate

| Reactants | Acid | Reaction conditions | | Elemental Analysis | | | Remarks |
| --- | --- | --- | --- | --- | --- | --- | --- |
| | | Temp. | Time | % C | % H | % N | |
| 10 g Low viscosity WSCA in NMP 70 ml Acetonitrile | 50 g MSA | r.t. | overnight | 38.70 38.73 | 6.05 5.92 | <0.1 <0.1 | mostly hydrolyzed cellulose still water soluble |
| 10 g Med. viscosity WSCA in DMSO 70 ml Acetonitrile | 50 g MSA | r.t. | overnight | 30.21 30.02 | 6.39 6.59 | <0.05 <0.05 | |
| 10 g Low viscosity WSCA in DMSO 70 ml Acetonitrile | 50 g MSA | r.t. | overnight | 36.65 36.43 | 5.99 5.99 | <0.05 <0.05 | |
| 10 g Low viscosity WSCA in DMSO 70 ml Acetonitrile | 50 g Sulfuric Acid | 50° C. | overnight | 25.95 26.03 | 4.10 3.91 | <0.05 <0.05 | |
| 10 g Low viscosity WSCA in DMSO 70 ml Acetonitrile | 50 g Sulfuric Acid | 75° C. | 2 h | 28.06 28.21 | 7.32 7.51 | 0.97 0.96 | |

EXAMPLE 2

10 g of water soluble cellulose acetate was dissolved in 70 ml DMSO. To 70 ml acetonitrile in a 250 ml round bottom flask, cooled in an ice bath, 50 g of sulfuric acid was slowly added dropwise via an addition funnel, making sure no heating occurred. The water soluble cellulose acetate solu- -continued

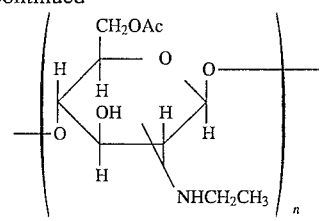

The present invention provides a method of selectively aminating cellulose acetate with amines. The invention may be practiced by using the methods as set forth in Example 3 wherein ethylamine, Raney Ni and aluminum t-butoxide were used to aminate the low-viscosity, water-soluble cellulose acetate in NMP as solvent. Other polar solvents such as dimethyl acetamide and other metal catalysts, and aluminum alkoxides may also be used. It was determined that the best amination results were obtained at 75° C. reaction temperature as set forth in Example 3. The site of amination was not conclusively determined but the 2nd and 3rd positions on the cellulose ring have an equal probability of attack. The 6th position can undergo amination, but as a primary hydroxyl group, it is not very favorable for attack under these reaction conditions. The results are summarized in Table 2.

TABLE 2

Summary of Results of Amination of Water Soluble Cellulose Acetate

| Reactants | Catalyst | Reaction conditions | | Elemental Analysis[a] | | |
|---|---|---|---|---|---|---|
| | | Temp. | Time | % C | % H | % N |
| 10 g Low viscosity WSCA in NMP 10 g ethylamine | 3.5 g Raney Ni, 12 g Al t-butoxide | r.t. | overnight | 37.51 37.54 | 6.55 6.45 | 0.81 0.76 |
| 10 g Low viscosity WSCA in NMP 10 g ethylamine | 3.5 Raney Ni, 12 g Al t-butoxide | 50° C. | overnight | 33.93 33.98 | 6.18 5.95 | 0.68 0.57 |
| 10 g Low viscosity[b] WSCA in NMP 10 g ethylamine | 3.5 g Raney Ni, 12 g Al t-butoxide | 75° C. | 6 h | 31.39 31.17 | 5.81 6.09 | 1.11 1.09 |
| 10 g Low viscosity[c] WSCA in NMP 10 g ethylamine | 3.5 g Raney Ni, 12 g Al t-butoxide | 75° C. | overnight | 34.39 34.29 | 5.78 5.75 | 1.13 1.13 |

[a]elemental analyses were done in duplicates in all cases; [b]the $^1$H NMR analysis of the product in this run indicated the degree of amination to be 0.048 amino group per glucoside ring; [c]the $^1$H NMR analysis of the product in this run indicated the degree of amination to be 0.038 amino group per glucoside ring.

The results shown in Table 2 indicate that the amination process using ethylamine and Raney Ni and aluminum t-butoxide as reagents is reproducible with consistent results. The degree of amination increases with temperature, with 75° C. giving the best results. The percentages of elements in the product were determined by elemental analysis.

The amount of reagent contamination in the product was reduced by dissolving the product in a minimal volume of HCl and precipitating out the product in acetone. The HCl reacts with the Raney Ni and aluminum t-butoxide thereby removing them from the product.

The amination of water soluble cellulose acetate with ethylamine to produce N-ethyl chitosan was confirmed by elemental analysis. This amination process may be performed with WSCA and other alkylamines such as methylamine, propylamine, butylamine, pentylamine, and hexylamine to produce respectively the N-methyl, N-propyl, N-butyl, N-pentyl, and N-hexyl chitosans. The amination can also be carried out using ammonia as the aminating agent wherein the resulting product is a synthetic analog of chitosan. The process could also be employed in a parallel manner to react WSCA with carboxyalkylamines to generate polymers with amphoteric functional groups (see Muzzarelli et al., *Carbohydrate Research* 107, 199–214 (1982)). Chelation properties and the strength of hydrogen bonding change with the substituent on the amino group, and the general amination process disclosed herein enables the economical production of a number of N-alkyl chitosans with varying plasticities, chelation capabilities, membrane- and fiber-forming characteristics, and other properties. Furthermore, the use of a starting material wherein there is homogeneity at the reaction site, e.g., water soluble cellulose acetate, promotes homogeneity of the end product. On the other hand, chitosan, for example, as starting material is crucially heterogeneous in that it is partially acetylated at the reaction site.

EXAMPLE 3

To a solution of 10 g low viscosity water soluble cellulose acetate in 75 ml NMP, 3.5 g Raney Ni and 12 g of aluminum t-butoxide, both in approximately 30 ml NMP, were added under argon atmosphere with continuous stirring in an ice bath. 10 g of ethylamine was then added slowly and then placed in a 75° C. oil bath with continuous stirring under argon atmosphere overnight. 80 ml of water was then added to decrease solution viscosity (on repeated procedures, sometimes the amount of water was increased in proportion to the amount of viscosity). The pH of the solution was then lowered by using 50% HCl-H$_2$O solution added dropwise to the reaction flask. The actual pH was not recorded; the amount of 50% HCl-H$_2$O added was determined by the amount of unreacted Ni in the flask. In this case, about 100 ml 50% HCl-H$_2$O was added to the flask. Once the release of hydrogen gas diminished, the solution was stirred overnight. The gray gel-like material was dropped into 600 ml of water to lower its viscosity. This was then vacuum filtered and dropped slowly into 600 ml acetone where a fluffy cream color precipitate was obtained. The precipitate was vacuum filtered overnight and vacuum oven dried at 50° C. until a constant weight was obtained. The product was then purified by dissolving it in about 120 ml 50% HCl-H$_2$O and vacuum filtering, adding small amounts of water to facilitate filtration. The product was vacuum oven dried at 50° C. until a constant weight was obtained.

I claim:

1. A method of producing an amidated water soluble cellulose acetate comprising amidating a water soluble cellulose acetate substrate with acetonitrile in dimethylsulfoxide and in the presence of concentrated sulfuric acid.

2. An amidated water soluble cellulose acetate produced by the method of claim 1.

3. A method of producing an alkylaminated water soluble cellulose acetate comprising reacting a water soluble cellulose acetate with an alkylamine in a polar solvent in the presence of a metal catalyst and aluminum alkoxide.

4. The method of claim 3 wherein the reaction is carried out in 1-methyl-2-pyrrolidinone in the presence of Raney nickel catalyst and aluminum t-butoxide.

5. The method of claim 3 wherein the alkylamine is selected from the group consisting of methylamine, ethylamine, 1-aminopropane, 2-aminopropane, 1-aminobutane, 2-aminobutane, 1-aminopentane, 2-aminopentane, 3-aminopentane, 1-aminohexane, 2-aminohexane and 3-aminohexane.

6. The alkylaminated water soluble cellulose acetate produced by the method of claim 3 or 4.

7. The alkylaminated water soluble cellulose acetate produced by the method of claim 5.

8. A method of producing an aminated water soluble cellulose acetate comprising reacting a water soluble cellulose acetate with ammonia in a polar solvent in the presence of a metal catalyst and aluminum alkoxide.

9. The aminated water soluble cellulose acetate produced by the method of claim 8.

10. The method of claim 3, wherein the alkylamine is a carboxyalkylamine.

11. The carboxyalkylaminated water soluble cellulose acetate produced by the method of claim 10.

* * * * *